United States Patent

Levy

[11] 3,892,614
[45] July 1, 1975

[54] ELECTROSTATIC LAMINATING APPARATUS AND METHOD

[75] Inventor: Warren W. Levy, Cynwyd, Pa.

[73] Assignee: The Simco Company, Inc., Lansdale, Pa.

[22] Filed: Mar. 8, 1973

[21] Appl. No.: 339,188

[52] U.S. Cl. ............... 156/272; 156/380; 317/262 E
[51] Int. Cl.² ...................... B32B 31/00; H05F 3/00
[58] Field of Search ........... 156/272, 380; 317/2 A, 317/2 F, 262 A, 262 E; 117/93.1 CD; 226/94

[56] References Cited
UNITED STATES PATENTS

| | | | |
|---|---|---|---|
| 3,124,457 | 3/1964 | Schwertz | 96/1.4 |
| 3,234,019 | 2/1966 | Hall | 96/1.3 |
| 3,396,308 | 8/1968 | Whitmore | 317/2 F |
| 3,462,909 | 8/1969 | Anderson | 156/380 |
| 3,475,652 | 10/1969 | Levy | 317/2 F |
| 3,653,064 | 3/1972 | Inoue et al. | 96/1 R |
| 3,730,753 | 5/1973 | Kerr | 317/2 A |

Primary Examiner—Charles E. Van Horn
Assistant Examiner—M. G. Wityshyn
Attorney, Agent, or Firm—Stanley Bilker

[57] ABSTRACT

Electrostatic laminating apparatus and method in which two or more sheets or articles to be pinned together are passed in close proximity or in contact with each other through an electric field that includes a first ionizing device for impinging unipolar ions of a particular polarity upon one side of the sandwich and a second ionizing device for (1) impinging unipolar ions of the opposite polarity on the other side of the sandwich or (2) simultaneously directing ions of both polarities on the other side of the sandwich. No physical contact occurs between the laminate and any of the ionizing devices, and the resultant net charge on the electrostatically pinned laminate is neutral.

7 Claims, 5 Drawing Figures

PATENTED JUL 1 1975 3,892,614

ELECTROSTATIC LAMINATING APPARATUS AND METHOD

This invention relates to electrostatic pinning systems, and more particularly relates to an electrostatic laminating apparatus and method in which two or more sheets or articles may be adhered together by electrostatic forces.

In many industrial and commercial applications, it is frequently desirable to pin two or more sheets or articles together preparatory to subsequent operations or as a measure to protect one of the articles from damage because of its fragile nature. For example, in the stacking of large sheets of plate glass which have just been polished, it is important to apply an interfacing of paper or other suitable material in order to protect the delicate surfaces of the glass from scratching. Because of the frangible nature of the glass surfaces, it becomes important to avoid the imposition of undue pressures bearing on relatively small zones of the plate even during application of the protective sheet. Other areas in which pinning techniques find important application are in the photographic field, silk screen printing arts and in many other commercial and industrial processes.

While electrostatic pinning procedures have been contemplated in the past, one of the problems associated with the use of such earlier systems was the necessity to contact one of the articles to be pinned with a grounded surface. This was frequently undesirable if the operation had to be performed on a moving article, especially when that article had a surface sensitive to scratching. If a ground roller were substituted for the contacting device, then only a line contact would be effected, a situation usually resulting in inadequate holding.

A second problem associated with the use of prior systems has been in the creation of a net positive or negative charge on the electrostatically pinned laminate, such charge tending to attract dust particles or functioning as repulsive or attracting poles with respect to adjacent materials of similar or dissimilar nature. These latter conditions acted to impede further processing.

It is therefore an object of this invention to provide an electrostatic laminating apparatus and method in which all heretofore encountered drawbacks are eliminated.

Another object of this invention is to provide an electrostatic laminating apparatus and method in which no physical contact occurs between the pinning apparatus and the sheets or articles to be adhered.

Yet another object of this invention is to provide an electrostatic pinning apparatus in which the electrostatic charges can be applied over a relatively wide area of the articles to be laminated.

Yet still another object of this invention is to provide an electrostatic pinning apparatus in which one of the ionizing sources may be of shockless construction.

Still a further object of this invention is to provide an electrostatic pinning apparatus employing a first ionizing source which emits unipolar ions and a second ionizing source which emits ions of both polarities.

Another object of this invention is to provide an electrostatic laminating apparatus and method in which the net electrostatic charge on the outer surfaces of the laminate is neutral.

Other objects of this invention are to provide an improved device and method of the character described that is easily and economically produced, sturdy in construction, and highly efficient and effective in operation.

With the above and related objects in view, this invention consists of the details of construction and combination of parts as will be more fully understood from the following detailed description when read in conjunction with the accompanying drawing in which.

Referring now in greater detail to the drawing in which similar reference characters refer to similar parts, there is shown an electrostatic pinning system for electrostatically laminating two or more sheets or articles together.

Figure 1:
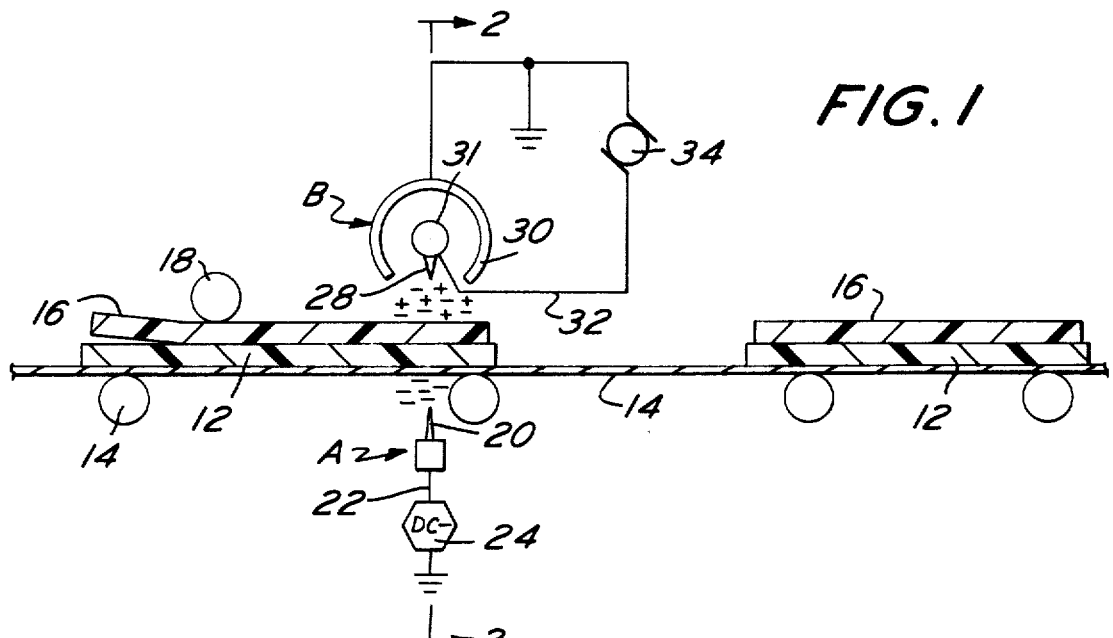
FIG. 1 is a side elevational and partly schematic view of an electrostatic pinning apparatus embodying this invention.
Figure 2:
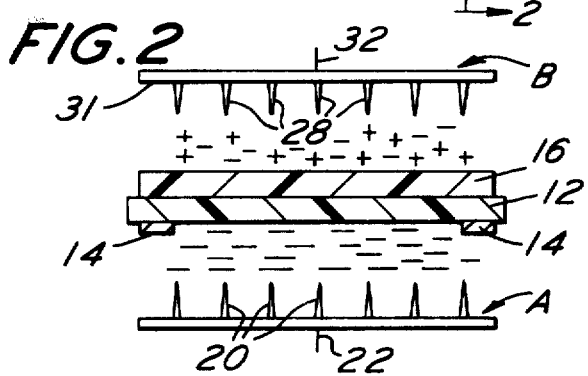
FIG. 2 is a sectional view taken generally along lines 2—2 of FIG. 1.

By way of illustration, a first sheet 12, such as a plate of glass, is transported on a tape or roller conveyor 14 which carries the first sheet along by the marginal edges thereof. A second sheet 16, such as paper or cardboard, is laid over the first sheet 12 and held in relatively close proximity therewith by gravity or in actual contact with the first sheet by a suitable device, as a second tape or roller conveyor 18 which urges just the edges of the two sheets together. The two sheets 12 and 16 are then simultaneously passed between a first ionizing device A which directs ions of a single polarity toward and upon one side of the laminate and a second ionizing device B which directs both positive and negative ions upon the other side of the laminate.

The first ionizing device A may constitute a static bar of the general construction shown in prior U.S. Pat. No. 3,137,806. A plurality of spaced discharge points 20 are directly coupled by way of a cable 22 to a D.C. power supply 24 which applies a voltage in the range of 7,000 to 25,000 volts across the points 20 and ground. As illustrated, the D.C. generator 24 causes ionization of the air about the points 20 such that ions of a negative polarity are created and directed toward the underface of the sheet 12. However, it is to be understood that a positive ion generation 25 may be employed to cause the emission of positive ions for impingement at the undersurface of the sheet 12.

The ionizing device B may comprise a static bar of the general construction shown in U.S. Pat. No. 2,163,294 wherein a plurality of points 28 adjacent spaced from a conductive casing 30 and supported by a conductive rod 31 are connected directly by a cable 32 to an A.C. power supply. The A.C. generator 34 produces a voltage in the range of 2,500 to 15,000 volts with respect to ground such that both positive and negative ions are created in the gap between the points 28 and the ground casing 30. These positive and negative ions are then directed upon the upper surface of the sheet 16. However, it is to be noted that the A.C. ionizing device B may be a shockless type static bar of the general construction shown and described in U.S. Pat.

No. 3,120,626 wherein the points 28 are capacitively coupled to the A.C. generator 34 through a series of sleeves of conductive material in spaced insulative disposition about the rod 31 which may be a continuation of cable 32.

The ions of both polarities which are emitted by the A.C. static bar B acts as a grounded conductive backround above the articles to be laminated and thereby produce an electric field with the ionizing device A to drive the unipolar ions emitted from the ionizing device A toward the underside of sheet 12. That is, the positive and negative ions emitted by the A.C. bar B define a conductive path from the upper surface of the laminate to the grounded casing of the A.C static bar and thence back to the other side of the D.C. generator 24

Figure 3:
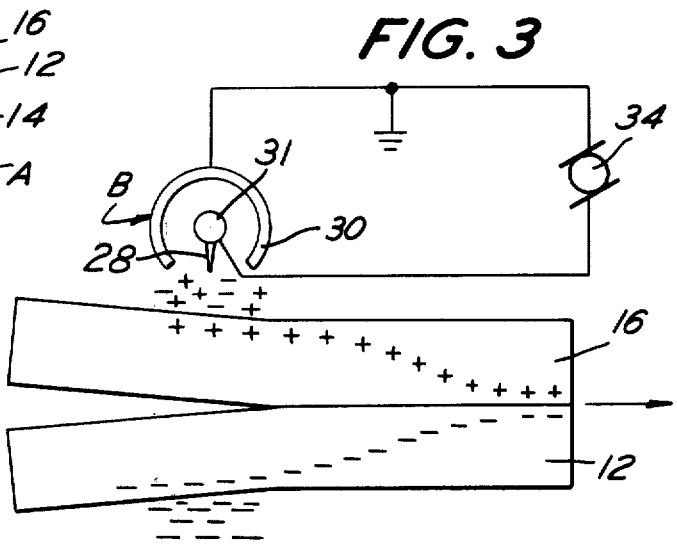
FIG. 3 is a schematic view showing the distribution of charges in the laminated materials.

Referring to FIG. 3, as negative charges collect on the undersurface of sheet 12, positive ions are attracted to the upper surface of sheet 16. These equal and opposite charges on the two outside surfaces create the attractive forces holding the two sheets together. Polarization of the internal molecules and the movement of the internal charge carriers increase the holding forces. As the bonded materials pass out of the field of the A.C. bar B and the ionizing device A, the negative and positive ions move toward the upper surface of sheet 12 and lower surface of sheet 16 respectively to further tighten the electrostatic bond. Therefore, while the interfaces are bound tightly together by the opposite charges on the opposed interior surfaces of the respective sheets 12 and 16, the effective net overall charge on the sheet combination is zero. Accordingly, with respect to other neutral articles or laminates stacked thereupon or placed adjacent thereto, the recently electrostatically pinned but neutral laminate will exert no attractive or repelling force, thus enabling full control in handling.

Attention is invited to the fact by impinging ions of one polarity across an air gap against one side of a laminate while directing ions of both polarities across an air gap against the other side of the laminate, there is no direct contact of the laminate with the electrostatic pinning device per se. Accordingly, there is no danger of scratching the surfaces of the laminate in contradistinction to the likelihood of scratching occurring when charge transfer would be effected through rollers or the like. Furthermore, the ion spray emitted by the static bars A and B allows a relatively wide area of the sheet or article surface to be exposed compared to the line contact which would be produced by a roller. In this manner, charge transfer can be accomplished with greater efficiency. Also, there is no need for the sheets 12 and 16 to be pressed into contact with each other during delivery to the position of the ionizing devices A and B. It is only necessary that the sheets or articles be in close proximity with each other in order to effect pinning.

As is further apparent, the single polarity and dual polarity ionizing devices A and B may be reversed in position so that the A.C bar B would appear on the bottom while the D.C. bar A would be on the top. It is also quite possible and frequently desirable to transport the sheets or articles 12 and 16 in a generally vertical path, in which case the ionizing devices A and B are arranged to direct their emission in a horizontal direction. In the foregoing dual polarity-single polarity system, it is only necessary to achieve a neutral laminate that the single polarity ionizer A be set so as not to exceed a certain maximum which would be determined by the ability of the dual polarity device B to produce opposite polarity ions. Thus, within its operating range, the dual polarity - single polarity system is self-regulating and will supply only the number of opposite polarity ions to balance the single polarity ions collected by the laminate.

Figure 4:
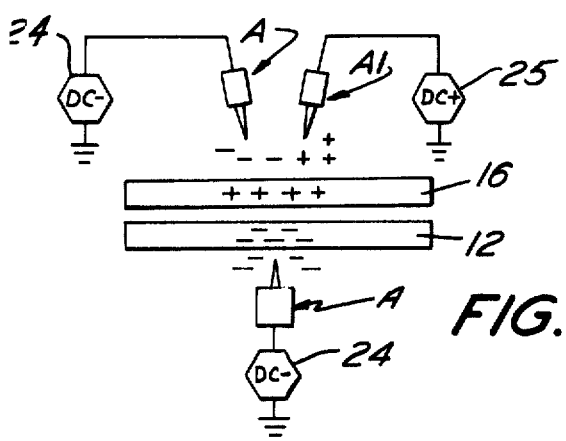
FIG. 4 is a partly schematic view of a modified form of this invention.

Referring now to FIG. 4, a pair of D.C. bars A and A1 that are of opposite polarity may be substituted for the single A.C. bar B. Thus, a D.C bar A coupled to a D.C source of negative voltage would direct negative ions toward the upper surface of the sheet 16 while a D.C. bar A1 coupled to a positive D.C. generator 25 would simultaneously direct positive ions toward the same upper surface. The net effect would be substantially similar to an A.C. bar B. At the same time, a second D.C. bar A would direct negative ions toward the undersurface of sheet 12. The dual D.C. bars A and A1 located above the sheets 12 and 16 are balanced so that the number of positive and negative ions created by the dual D.C. bars are approximately equal within certain limits. Again, as in the case of the A.C.-D.C. system A-B of FIG. 3, the double D.C.-D.C. system (A, A1-A) is set so that the ion production of the dual D.C. source A-A1 above the sheets is equal to or greater than that of the single D.C. source A below the sheets in order to insure neutrality of the emerging laminate. It is to be noted however that because of the creation of ion clouds which are carried along with the sheets 12 and 16, neutralization of the laminate may still be effected in conjunction with pinning even when the number of positive ions emitted by the source A1 is less that the number of negative ions emitted by the bar A below the sheets. It is also to be noted that the bars A and A1 on opposite sides of the sheets may be interchanged so that positive ions are directed upwardly. Moreover, as in the instance of the dual polarity A.C. system, the double D.C.-D.C. does not require pressing the sheets together nor is there any contact made by the ionizing devices per se.

Figure 5:
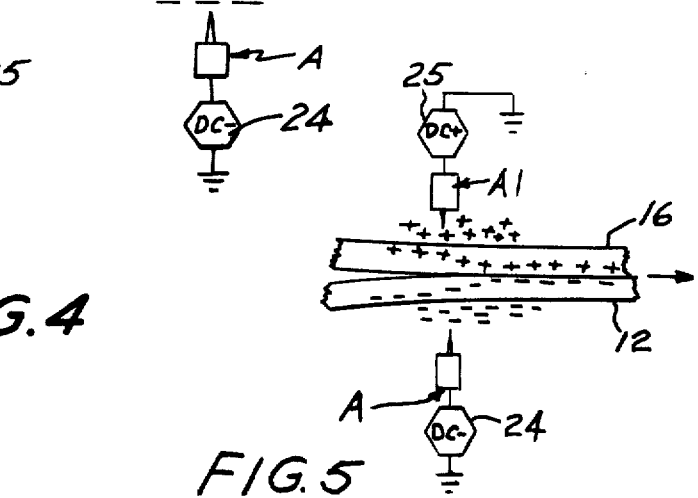
FIG. 5 is a partly schematic view of another modified form of the invention.

Referring now to FIG. 5, there is shown still a further embodiment of the present invention in which a field of ions creates a conductive path from one ionizing device through the other to ground, each ionizing device providing a conductive backround for the other thereby eliminating any direct contact of the charging device with the articles to be pinned together. In FIG. 5, a first D.C. ionizing device A of negative polarity is directed toward one side of the materials to be laminated while a second D.C. ionizing device A1 directs positive ions toward the other side. Since the sheets 12 and 16 are charged to opposite polarities, they will become attracted to each other and pinned as a laminate. Provided the collection of ions from each ionizer is substantially exactly equal, a laminate having no net charge will be produced. However, the voltages applied to the two ionizers A and A1 need not necessarily be equal because of the difference in mobility of positive and negative ions plus the fact that variations in speed of travel of the materials to be laminated or in spacing of the ionizers from the moving materials would change the amount of charge deposited. In general, tests performed on oppositely-arranged, opposite-polarity D.C. system indicates that even over a fairly wide range of inequality in the two sources, such a system tends to be self-balancing when the laminate leaves the area of the ionizers. Thus, because ion clouds created in the zone of the ion sources tend to be carried along with the materials leaving the vicinity of the ion devices, compensatory effects are produced down the line to cause neutralization. That is, these ion clouds no longer serve as grounded conductive backrounds when the actual ground of the ionizing devices is no longer present. However, the ions in the cloud do become attracted to the now laminated sheets to the extent required for neutralizing an excess of ions of one polarity. Nevertheless, where there is a wide differential in ion production from two D.C. sources A and A1 of opposite polarity, the laminate tends to become charged to the polarity of the stronger source.

As may be apparent from the foregoing, the use of the spaced ionizing system of the instant invention can be employed for laminating more than two sheets of articles, and three or four plies can readily be pinned together by any of the embodiments of the present invention.

Although this invention has been described in considerable detail, such description is intended as being illustrative rather than limiting, since the invention may be variously embodied without departing from the spirit thereof, and the scope of the invention is to be determined as claimed.

What is claimed is:

1. Apparatus for electrostatically laminating two or more articles together, comprising:
   means for juxtaposing a set of articles with respect to each other so that adjacent surfaces thereof are in close proximity,
   first ionizing means for emitting ions of a single polarity and being adjacently spaced from one side of the set of juxtaposed articles so as to direct unipolar ions toward an outboard surface thereof,
   second ionizing means for emitting ions of both polarities and being adjacently spaced from the other side of the set of juxtaposed articles, said second ionizing means being in confronting disposition with said first ionizing means and simultaneously directing positive and negative ions toward a discrete zone of an opposing outboard surface of said set of articles in juxtaposition with each other to effect pinning thereof while the pinned set is substantially neutral.

2. The invention of claim 1 including means to transport said articles through said first and second ionizing means.

3. The invention of claim 1 wherein said second ionizing means comprises an A.C. static bar.

4. The invention of claim 1 wherein said second ionizing means comprises a pair of D.C. static bars of opposite polarity.

5. A method for electrostatically laminating two or more articles together comprising the steps of:
   transporting the articles along a longitudinal path with a set of articles juxtaposed with each other in a direction substantially normal to the longitudinal path, and
   simultaneously passing the juxtaposed articles between a first ionizing device emitting unipolar ions and a second ionizing device emitting ions of both polarities toward a discrete zone, said first and second ionizing devices being adjacently spaced respectively from opposing sides of said juxtaposed set of articles and in confronting disposition with each other whereby the field of ions from each ionizing device acts as a conductive path to the other ionizing device and ground so as to cause pinning of the articles in the set without said articles being contacted by either of said ionizing devices while the pinned set emerges in substantially neutral disposition.

6. The method of claim 5 wherein said second ionizing device is coupled to an A.C. high voltage source and emits ions of both polarities.

7. The method of claim 5 wherein said second ionizing means constitutes a pair of devices, each of which is coupled to a D.C. source of opposite polarity.

* * * * *